(12) United States Patent
Wu et al.

(10) Patent No.: US 10,496,300 B2
(45) Date of Patent: Dec. 3, 2019

(54) METHOD AND APPARATUS FOR SERVER MANAGEMENT

(71) Applicant: EMC IP Holding Company LLC, Hopkinton, MA (US)

(72) Inventors: Chao Wu, Shangai (CN); Li Zhai, Shanghai (CN); Sheng Mei, Shanghai (CN); Robert Guowu Xia, Shanghai (CN); Winson Yin Wang, Shanghai (CN); Zhi Feng, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/267,460

(22) Filed: Sep. 16, 2016

(65) Prior Publication Data

US 2017/0075607 A1    Mar. 16, 2017

(30) Foreign Application Priority Data

Sep. 16, 2015   (CN) .......................... 2015 1 0591086

(51) Int. Cl.

| G06F 13/10 | (2006.01) |
|---|---|
| G06F 3/06 | (2006.01) |
| G06F 13/42 | (2006.01) |
| G06F 21/60 | (2013.01) |
| G06F 21/34 | (2013.01) |
| H04L 12/24 | (2006.01) |
| H04L 29/06 | (2006.01) |

(52) U.S. Cl.
CPC ............ *G06F 3/0622* (2013.01); *G06F 3/067* (2013.01); *G06F 3/0652* (2013.01); *G06F 13/102* (2013.01); *G06F 13/4282* (2013.01); *G06F 21/34* (2013.01); *G06F 21/602* (2013.01); *H04L 41/28* (2013.01); *H04L 63/10* (2013.01); *H04L 63/20* (2013.01); *G06F 2213/0042* (2013.01); *G06F 2221/2143* (2013.01)

(58) Field of Classification Search
CPC combination set(s) only.
See application file for complete search history.

(56) References Cited

U.S. PATENT DOCUMENTS

| 2006/0208066 | A1* | 9/2006 | Finn | .................... | G06K 7/0004 |
|---|---|---|---|---|---|
| | | | | | 235/380 |
| 2008/0120726 | A1* | 5/2008 | Tsunehiro | ............... | G06F 21/77 |
| | | | | | 726/27 |
| 2009/0193171 | A1* | 7/2009 | Ichikawa | ............... | G06F 3/0227 |
| | | | | | 710/316 |

(Continued)

FOREIGN PATENT DOCUMENTS

| CN | 1801122 | 7/2006 |
|---|---|---|
| CN | 201549223 | 8/2010 |

(Continued)

*Primary Examiner* — Yong J Choe
(74) *Attorney, Agent, or Firm* — BainwoodHuang

(57) ABSTRACT

Embodiments of the present disclosure disclose a server management method and a management device. The method comprises determining whether a USB device is connected to the server, the USB device including a permission of a respective user to the server. The method further comprises: in response to determining that the USB device is connected to the server, transmitting the permission to the server to enable the server to be operated based on the permission.

14 Claims, 2 Drawing Sheets

(56) References Cited

U.S. PATENT DOCUMENTS

Figure 1:
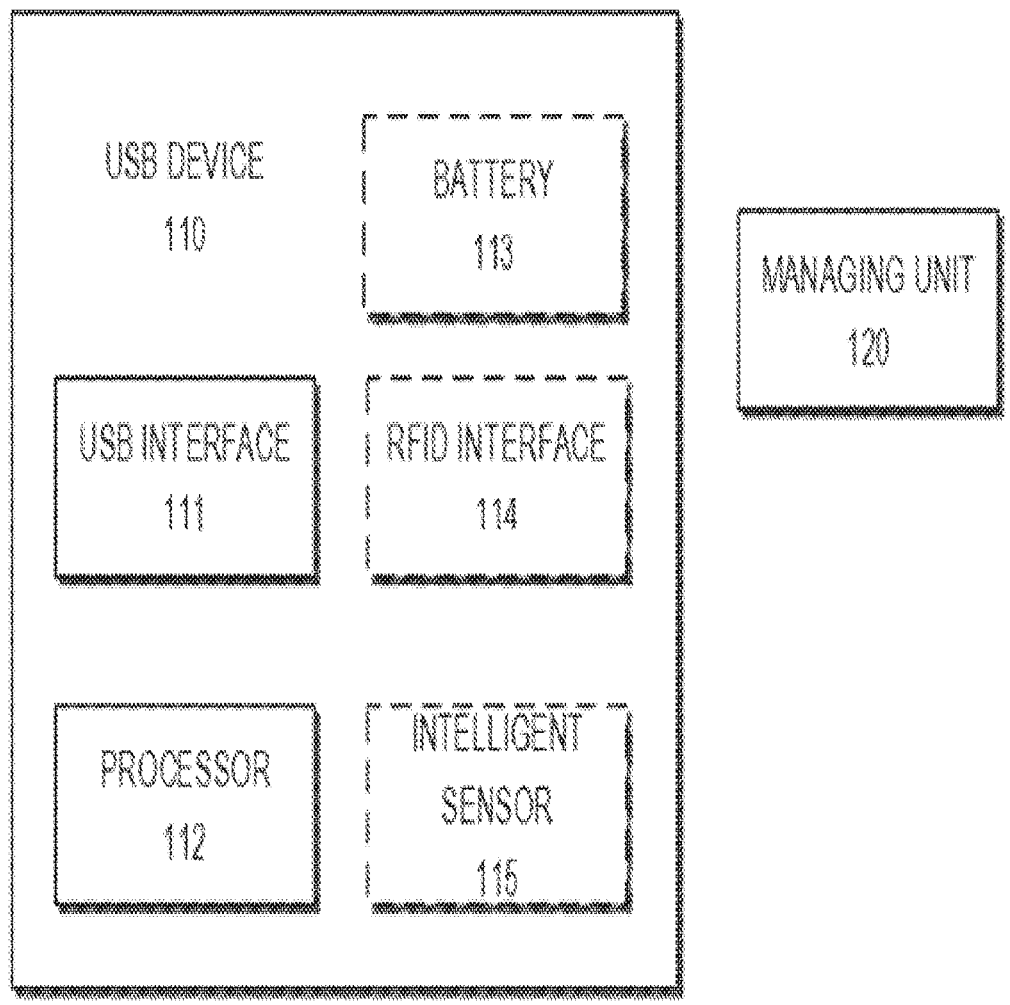

| | | | |
|---|---|---|---|
| 2010/0211805 A1* | 8/2010 | Chung | G06F 1/263 |
| | | | 713/300 |
| 2010/0241875 A1* | 9/2010 | Ishii | G06F 3/062 |
| | | | 713/193 |
| 2012/0274971 A1 | 11/2012 | Tanabe | |
| 2017/0034036 A1* | 2/2017 | Kohan | H04L 67/16 |

FOREIGN PATENT DOCUMENTS

| | | |
|---|---|---|
| CN | 101840472 | 9/2010 |
| CN | 102567682 | 7/2012 |
| CN | 103067372 | 4/2013 |

* cited by examiner

METHOD AND APPARATUS FOR SERVER MANAGEMENT

RELATED APPLICATION

This application claims priority from Chinese Patent Application Number CN201510591086.4, filed on Sep. 16, 2015 at the State Intellectual Property Office, China, entitled "SERVER MANAGEMENT METHOD AND MANAGEMENT SYSTEM," the contents of which is herein incorporated by reference in its entirety.

TECHNICAL FIELD

Embodiments of the present disclosure generally relates to the field of servers, and more particularly to a server management method and a server management device.

BACKGROUND

As the growth of the IT industry, the hardware's differences between different vendors are becoming smaller and the hardware's cost takes a lower percentage of the whole product. This gives the hardware supplier opportunities to utilize similar hardware configurations fulfill the needs of various different types of users.

SUMMARY

In embodiments of the present disclosure provide a server management method and a management system.

A first aspect of the present disclosure provides a method of managing a server. The method comprises, at a USB device: determining whether the USB device is connected to the server, the USB device including a permission of a respective user to the server; and in response to determining that the USB device is connected to the server, transmitting the permission to the server to enable the server to be operated based on the permission.

In one embodiment, the permission is stored in a read-only memory within the USB device.

In one embodiment, the method further comprises: in response to a decryption operation on the USB device, performing at least one of the following: entering a safe mode; stopping working; or erasing the read-only memory.

In one embodiment, the USB device comprises a battery configured to supply power to the USB device, and the method further comprises: in response to a voltage of the battery being below a threshold, erasing the read-only memory.

In one embodiment, the method further comprising: obtaining status information of the server via a USB interface between the USB device and the server.

In one embodiment, the USB device comprises an RFID interface and the method further comprises: transmitting the status information of the server to an external device via the RFID interface.

A second aspect of the present disclosure provides a method of managing a server. The method comprises: in response to receiving from a USB device a permission of a respective user to the server, operating the server based on the permission. The method may further comprise in response to failing to receive the permission from the USB device within a predetermined time period, shutting down the server or operating the server based on a default permission.

A third aspect of the present disclosure provides a USB device for managing a server, the USB device including a permission of a respective user to the server, the USB device comprising: a processor configured to: determine whether the USB device is connected to the server, the USB device including a permission of a respective user to the server; and in response to determining that the USB device is connected to the server, transmit the permission to the server to enable the server to be operated based on the permission.

In one embodiment, the permission is stored in a read-only memory within the USB device.

In one embodiment, in response to a decryption operation on the USB device, the processor is configured to cause the USB device to at least one of the following operations: entering a safe mode; stopping working; or erasing the read-only memory.

In one embodiment, the USB device comprises a battery configured to supply power to the USB device, and the processor is further configured to: in response to a voltage of the battery being below a threshold, erase the read-only memory.

In one embodiment, the USB device is configured to obtain status information of the server via a USB interface between the USB device and the server.

In one embodiment, the USB device comprises an RFID interface and is further configured to transmit the status information of the server to an external device via the RFID interface.

A fourth aspect of the present disclosure provides a device for managing a server comprising: a management unit configured to: in response to receiving from a USB device a permission of a respective user to the server, operate the server based on the permission; and in response to failing to receive the permission from the USB device within a predetermined time period, shut down the server or operate the server based on a default permission.

A fifth aspect of the present disclosure provides a computer program product including a program code that, when executed on a processor, causes the processor to perform the method of the first or second aspect of the present disclosure.

The USB device provided by the embodiments of the present disclosure has a hot plug feature, which is small and easy to install and carry; therefore, it is convenient to maintain the server. Since the USB device can be customized, especially with the option of using other communication protocols than the universal USB protocol utilized in the industrial circle, it possesses a higher level of safety. Moreover, it also offers an additional monitor interface via the RFID interface.

BRIEF DESCRIPTION OF THE ACCOMPANYING DRAWINGS

Figure 2:
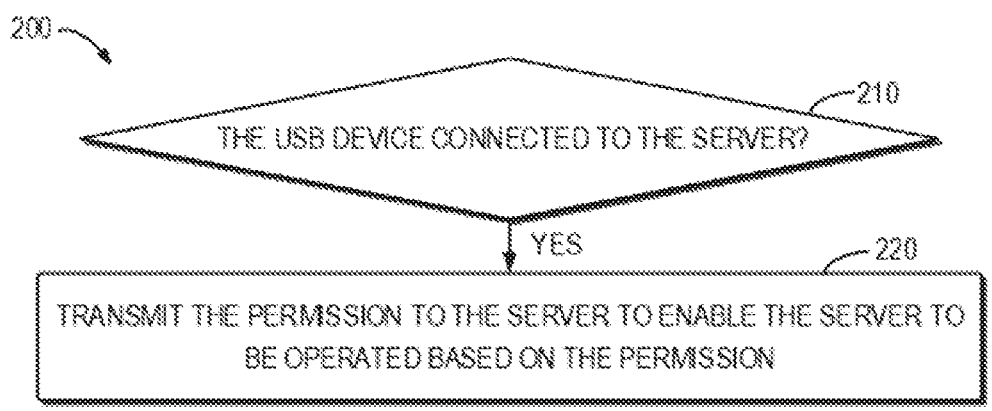

The accompanying drawings illustrated herein provide further understanding of the present disclosure and constitute part of the present application. The exemplary embodiments of the present disclosure and illustrations thereof are used to explain the present disclosure and do not constitute improper limitation of the present disclosure, in which:

FIG. 1 is a block diagram that schematically illustrates a server management system in one embodiment of the present disclosure; and FIG. 2 is a flow chart that schematically illustrates a server management method in one embodiment of the present disclosure.

DETAILED DESCRIPTION

Hereinafter, the principle and spirit of the present disclosure will be described with reference to several exemplary embodiments shown in the accompanying drawings. It should be understood that these embodiments are described only for enabling those skilled in the art to better understand and then further implement the present disclosure, not intended to limit the scope of the present disclosure in any manner.

The technical term "permission" used herein refers to permission of the user of the server to the server hardware, i.e., the performance level of the server. As an example, permission can indicate how many CPUs and how many CPU cores of the server can be used by the user, the maximum operation frequency of the CPU, size of the available memory and size of the available storage space and so on. These hardware parameters are key parameters to determine the performance level of the server, and limitations on these parameters are equal to the limitations on the permission of the user.

FIG. 1 is block diagram schematically illustrates a server management system 100 according to one embodiment of the present disclosure. As shown in FIG. 1, the system 100 includes two parts, i.e., a USB (Universal Serial Bus) device 110 and a managing unit 120. The USB device 110 stores permission of the user to the server 120. In one embodiment, the permission is stored in a read-only memory within the USB device 110. In FIG. 1, the read-only memory (ROM) is illustrated as a component of a processor 112; however, the read-only memory can also be a discrete device. The read-only memory can be implemented with PROM (Programmable Read-Only Memory), EPROM (Electrically Programmable Read-Only Memory), EEPROM (Electrically Erasable Programmable Read-Only Memory), OTPROM (One Time Programmable Read-Only Memory) and flash drive, and preferably with EEPROM.

The managing unit 120 is generally integrated in the server and can be implemented by software, firmware, hardware or any combinations thereof. The USB device 110 can be plugged into the server and can communicate with the server via the USB interface 111. It should be noted that the communication protocol here between the USB device 110 and the server can be implemented with the customized USB protocol instead of the universal USB protocol in the industrial circles. In this way, the difficulty of cracking the system 100 is raised and the safety of the system 100 is enhanced. The USB interface 111 can communicate with the server to obtain from the server its status information. Moreover, the managing unit 120 in the server can receive permission from the USB device and cause the server to be operated based on the received permission.

In one embodiment, if the managing unit 120 fails to receive permission from the USB device 110 within a predetermined time, the managing unit 120 may shut down the server or operate the server based on the default permission. The USB device 110 can communicate with the managing unit 120 at a constant frequency; if the managing unit 120 fails to receive permission from the USB device 110 within the predetermined time (e.g., one minute), it indicates there might be a cracking operation on the USB device or the server; therefore, the management unit 120 may shut down the server or operate the server based on the default permission, thereby preventing the cracking of the system. The default permission can, for example, be the permission of the server at the minimum level, or the permission currently used by the user, or the permission at other levels customized based on the service provided to the user.

As shown in FIG. 1, the processer 112 in the USB device 110 can also be used to detect a decryption operation on the USB device. For example, there might be a decryption operation on the USB device 110 if the housing of the USB device is detected loose. In one embodiment, upon detection of a decryption operation on the USB device 110, the USB device 110 can enter a safe mode, or stop working or erase the read-only memory, or perform more than one of the above operations, for example, erase the read-only memory and stop working.

In one embodiment, the USB device 110 optionally includes a battery 113. The USB device 110 can be powered by the server via the USB interface; however, considering the importance of the encryption device and that the total current of the modules included in the device might exceed the maximum current supported by the USB interface, a battery 113 is provided in the USB device. The battery 113 is configured to power the USB device and when a voltage of the battery is below a threshold, the USB device erases the read-only memory. If the voltage of the battery is too low to power the USB device 110, the safety of the USB device 110 may be affected. In order to prevent such a consequence, the USB device may erase the read-only memory, such that the managing unit 120 in the server cannot receive permission and is forced to be powered off or operated on the default permission accordingly.

In one embodiment, the USB device can obtain status information of the server via the USB interface 111, i.e., the USB device can be used to monitor operation status of the server. The status information can be stored either in a status register within the processor 12 or in other storage devices within the USB device 110. In one embodiment, the USB device 110 comprises an RFID (Radio Frequency Identification Devices) interface 114. An administrator can obtain status information of the server by RFID scan via the RFID interface 114, and the status information can be obtained by the USB device 110 via the USB interface 111 from the server. In addition, the USB device can also comprise an intelligent sensor 115 for monitoring the temperature and the voltage of the system; and when the temperature and/or the voltage exceeds a threshold, it sends an alarm to the server via the USB interface or to the administrator via the RFID interface or the like.

FIG. 2 is a flow chart schematically illustrates a server management method 200 according to one embodiment of the present disclosure. As shown in FIG. 2, the method 200 includes step 210 and step 220. At step 210, the USB device determines whether the USB device is connected to the server, where the USB device includes a permission of a respective user to the server. At step 220, the USB device transmits the permission to the server to enable the server to be operated based on the permission, in response to determining that the USB device is connected to the server.

In one embodiment, the permission may be stored in a read-only memory within the USB device.

In one embodiment, the method 200 further comprises: in response to a decryption operation on the USB device, the USB device may enter a safe mode, stop working, and/or erase the read-only memory.

In one embodiment, the USB device may comprise a battery configured to supply power to the USB device, and the method 200 may further comprises: in response to a voltage of the battery being below a threshold, erasing the read-only memory.

In one embodiment, the method 200 may further comprise: obtaining status information of the server via a USB interface between the USB device and the server.

In one embodiment, the USB device comprises an RFID interface and the method 200 further comprises: transmitting the status information of the server to an external device via the RFID interface.

According to one embodiment of the present disclosure, a method of managing a server may include: in response to receiving from a USB device a permission of a respective user to the server, operating the server based on the permission. Alternatively or additionally, in response to failing to receive the permission from the USB device within a predetermined time period, shutting down the server or operating the server based on a default permission.

In the description of the embodiments of the present disclosure, the term "comprise" and the like indicate an open inclusion, i.e., "include, but not limited to." The term "based on" indicates "at least partially based on." The term "an embodiment" or "the embodiment" indicates "at least one embodiment."

It should be noted that the embodiments of the present disclosure can be implemented by hardware, software or the combination of hardware and software. The hardware part can be implemented by dedicated logic while the software part can be stored in the memory and performed by an appropriate instruction execution system, such as a microprocessor or special-designed hardware. Those skilled in the art can understand the above device and method can be implemented by means of computer executable instructions or within the processor control code. In implementation, the programmable memory or data carrier, such as optical or electronic signal carrier can provide such code thereon.

Furthermore, although the drawings describe the operation of the method of the disclosure in a specific sequence, it does not necessarily require or suggest that the operation must be executed in the specific sequence or all shown operations must be executed to realize the expected result. On the contrary, the order of the steps depicted in the flow chart can be altered. Additionally or alternatively, some steps can be omitted or multiple steps can be combined into one step for execution, and/or one step is disintegrated into multiple steps for execution. It should also be noted that the features and functions of two or more apparatuses in the disclosure can be embodied in one apparatus. Conversely, the feature and function of one apparatus described above can be embodied by multiple apparatuses.

Although the disclosure is described with reference to multiple specific embodiments, it should be understood that the present invention is not restricted to the embodiments of the disclosure. The present invention is intended to encompass all kinds of modifications and equivalent arrangements included within the spirit and scope of the appended claims.

What is claimed is:

1. A method of managing a server using a Universal Serial Bus (USB) device, comprising:
   by the USB device, determining whether the USB device is connected to the server, the USB device including a permission of a respective user to the server;
   by the USB device in response to determining that the USB device is connected to the server, transmitting the permission to the server to enable the server to be operated based on the permission;
   providing, via the server, a level of operation of the server based on the permission; and
   by the USB device, monitoring conditions of the server while connected to the server,
   wherein the permission is a permission of a user of the server to use hardware of the server, and the permission specifies a performance level of the server as one or more hardware parameters including (1) a maximum number of central processing units (CPUs) and a maximum number of CPU cores of the server that can be used by the user, (2) a maximum operating frequency of a CPU of the server that can be used by the user, and (3) a size of available memory of the server that can be used by the user.

2. The method of claim 1, wherein the permission is stored in a read-only memory within the USB device.

3. The method of claim 2, further comprising, by the USB device:
   in response to a decryption operation on the USB device, performing at least one of the following:
   entering a safe mode;
   stopping working; or
   erasing the read-only memory.

4. The method of claim 2,
   wherein the USB device comprises a battery configured to supply power to the USB device;
   and further comprising, by the USB device in response to a voltage of the battery being below a threshold, erasing the read-only memory.

5. The method of claim 1, further comprising, by the USB device:
   obtaining status information of the server via a USB interface between the USB device and the server.

6. The method of claim 5,
   wherein the USB device comprises a Radio Frequency Identification (RFID) interface;
   and further comprising, by the USB device: transmitting the status information of the server to an external device via the RFID interface.

7. The method of claim 1, wherein, if the server fails to receive the permission from the USB device within a predetermined time, the server either shuts down or operates on a default permission.

8. The method of claim 7, wherein the default permission is one of a minimum-level permission, a permission currently in use, or a permission at another level customized based on the service provided to a user.

9. A Universal Serial Bus (USB) device for managing a server, comprising:
   a processor configured to:
   determine whether the USB device is connected to the server, the USB device including a permission of a respective user to the server;
   in response to determining that the USB device is connected to the server, transmit the permission to the server to enable the server to be operated based on the permission, the permission specifying a level of operation of the server based on the permission; and
   monitor conditions of the server while the USB device is connected to the server,
   wherein the permission is a permission of a user of the server to use hardware of the server, and the permission specifies a performance level of the server as one or more hardware parameters including (1) a maximum number of central processing units (CPUs) and a maximum number of CPU cores of the server that can be used by the user, (2) a maximum operating frequency of a CPU of the server that can be used by the user, and (3) a size of available memory of the server that can be used by the user.

10. The USB device of claim 9, wherein the permission is stored in a read-only memory within the USB device.

11. The USB device of claim 10, wherein in response to a decryption operation on the USB device, the processor is configured to cause the USB device to perform at least one of the following operations:
    entering a safe mode;
    stopping working; or
    erasing the read-only memory.

12. The USB device of claim 10, wherein the USB device further comprises a battery configured to supply power to the USB device, and the processor is further configured to: in response to a voltage of the battery being below a threshold, erase the read-only memory.

13. The USB device of claim 9, wherein the USB device is configured to obtain status information of the server via a USB interface between the USB device and the server.

14. The USB device of claim 13, wherein the USB device further comprises a Radio Frequency Identification (RFID) interface and is further configured to transmit the status information of the server to an external device via the RFID interface.

\* \* \* \* \*